(12) United States Patent
Dai et al.

(10) Patent No.: US 10,137,905 B2
(45) Date of Patent: Nov. 27, 2018

(54) OPTIMIZATION OF A VEHICLE TO COMPENSATE FOR WATER CONTAMINATION OF A FLUID OF A VEHICLE COMPONENT

(71) Applicant: TOYOTA JIDOSHA KABUSHIKI KAISHA, Toyota-shi, Aichi-ken (JP)

(72) Inventors: Siyuan Dai, Mountain View, CA (US); Yusuke Kashiba, Mountain View, CA (US); Shinichi Shiraishi, Mountain View, CA (US)

(*) Notice: Subject to any disclaimer, the term of this patent is extended or adjusted under 35 U.S.C. 154(b) by 167 days.

(21) Appl. No.: 15/363,368

(22) Filed: Nov. 29, 2016

(65) Prior Publication Data

US 2018/0148068 A1 May 31, 2018

(51) Int. Cl.
*B60W 50/029* (2012.01)
*B60W 10/20* (2006.01)
*B60W 10/184* (2012.01)
*B60W 10/06* (2006.01)
*G07C 5/08* (2006.01)
*G05D 1/00* (2006.01)
(Continued)

(52) U.S. Cl.
CPC ....... *B60W 50/029* (2013.01); *B60R 16/0234* (2013.01); *B60W 10/06* (2013.01); *B60W 10/184* (2013.01); *B60W 10/20* (2013.01); *B60W 50/0205* (2013.01); *G05D 1/0088* (2013.01); *G07C 5/0808* (2013.01); *G07C 5/0841* (2013.01); *B60W 2050/021* (2013.01); *B60W 2600/00* (2013.01)

(58) Field of Classification Search
None
See application file for complete search history.

(56) References Cited

U.S. PATENT DOCUMENTS 7,581,434 B1 * 9/2009 Discenzo ........... G01N 33/2888
73/53.01
8,892,451 B2 11/2014 Everett et al.
(Continued)

FOREIGN PATENT DOCUMENTS

| JP | S61-253237 | 11/1986 |
| JP | 2000-088750 | 3/2000 |
| JP | 2013-019354 | 1/2013 |

*Primary Examiner* — Thomas G Black
*Assistant Examiner* — Demetra R Smith-Stewart
(74) *Attorney, Agent, or Firm* — Burbage Law, P.C.; Jon-Michael Burbage; Elizabeth Ruzich

(57) ABSTRACT

The disclosure includes embodiments for modifying a performance of a vehicle component whose performance is affected by a vehicle fluid that is contaminated by water. A method according to some embodiments includes recording sensor data describing refractometry measurements for the vehicle fluid. The method includes determining contamination data that describes an amount of water present in the vehicle fluid. The method includes analyzing the contamination data to determine parameter data describing modifications for a set of parameters for an advanced driver assistance system ("ADAS system") that control the operation of the ADAS system, wherein the parameter data is operable to update the set of parameters and thereby modify the operation of the ADAS system to compensate for the amount of water present in the vehicle fluid so that vehicle component performs as though the vehicle fluid is substantially not contaminated by water.

20 Claims, 6 Drawing Sheets

(51) Int. Cl.
*B60R 16/023* (2006.01)
*B60W 50/02* (2012.01)

(56) References Cited

U.S. PATENT DOCUMENTS

2014/0216377 A1    8/2014  Aisin
2014/0300889 A1*  10/2014  DiFoggio ........... G01N 21/4133
                                                            356/51

* cited by examiner

OPTIMIZATION OF A VEHICLE TO COMPENSATE FOR WATER CONTAMINATION OF A FLUID OF A VEHICLE COMPONENT

BACKGROUND

The specification relates to optimization of an Advanced Driver Assistance System (herein "ADAS system" if singular, "ADAS systems" if plural) of a vehicle to compensate for water contamination of a non-water fluid of a vehicle component.

Vehicle control systems are becoming increasingly popular. One example of a vehicle control system is an ADAS system.

An ADAS system provides ADAS features to a vehicle. ADAS features include the functionality provided to a vehicle by an ADAS system included in the vehicle. Modern vehicles may include one or more ADAS systems. As such, a single vehicle may have the benefit of one or more ADAS features which are provided by the one or more ADAS systems of the vehicle.

A vehicle includes many different vehicle components that require vehicle fluids to provide their functionality. For example, a vehicle includes a power steering system (an example of a vehicle component), and the power steering system requires power steering fluid (an example of a vehicle fluid) to provide its functionality. If the power steering fluid becomes contaminated with water, then the power steering system will perform sluggish and provide an unsatisfactory experience for the driver of the vehicle.

SUMMARY

A common cause of a vehicle's decreased performance is water contamination of the vehicle's non-water fluids (herein "vehicle fluid" if singular, or "vehicle fluids" if plural). Water contamination of vehicle fluids can result in sluggish vehicle performance of one or more vehicle components due to an inability of the contaminated vehicle fluids to transfer power as expected or desired. For example, water contamination of vehicle fluids may increase the viscosity of the contaminated vehicle fluids and corrode the components of the vehicle's engine or powertrain.

Although the actual water increase in contaminated vehicle fluids depends on a variety of factors, including the environment and conditions of the vehicle components, vehicle technicians normally report that vehicle fluids are contaminated with water by about 1% to 2% by volume with each passing year. Experimentation shows that this is a significant amount of water contamination since this amount of water contamination is sufficient to negatively affect the performance of the vehicle (e.g., because the performance of the components of the vehicle are adversely affected by the water contamination).

Described herein is a system according to some embodiments for modifying the parameters for one or more ADAS systems of a vehicle to compensate for measured water contamination of one or more vehicle fluids of the vehicle. The system described herein includes, according to some embodiments, an optimization system of a server and an optimization client of a vehicle. The optimization system and the optimization client wireless communicate with one another via a wireless network. The optimization system and the optimization client work together to solve the problem of water contamination of vehicle fluids negatively affecting the performance of vehicle components, thereby resulting in the performance of the vehicle components providing an unsatisfactory experience for a driver of the vehicle.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method of modifying a performance of a vehicle component whose performance is affected by a vehicle fluid that is contaminated by water, the method including: recording sensor data describing refractometry measurements for the vehicle fluid; determining contamination data for the vehicle fluid based on the sensor data and the refractometry measurements described by the sensor data, where the contamination data describes an amount of water present in the vehicle fluid and indicates that the vehicle fluid is contaminated by water; and analyzing the contamination data to determine parameter data describing modifications for a set of parameters for an ADAS system that control an operation of the ADAS system, where the parameter data is operable to update the set of parameters and thereby modify the operation of the ADAS system to compensate for the amount of water present in the vehicle fluid so that vehicle component performs as though the vehicle fluid is substantially not contaminated by water. Other embodiments of this aspect include corresponding computer systems, apparatus, and computer programs recorded on one or more computer storage devices, each configured to perform the actions of the methods.

Implementations may include one or more of the following features. The method where the vehicle fluid is selected from a group that consists of: engine oil; brake fluid; fuel; power steering fluid; and transmission fluid. The method where the vehicle component is selected from a group that consists of: an engine; a brake; a brake line; a fuel injector; a fuel line; a power steering unit; and a transmission. The method where the ADAS system is a vehicular system that is operable to perform or control a performance of one or more of the following vehicle functions: how easily a steering wheel of the vehicle is turned by a driver of the vehicle; how much resistance the steering wheel provides to the driver when the driver turns the steering wheel; how readily a braking system of the vehicle decelerates when the driver depresses a braking pedal of the vehicle; how readily an engine of the vehicle accelerates when the driver of the vehicle depresses an accelerator of the vehicle; how aggressive or passive a transmission of the vehicle changes one or more gears of the transmission when the driver of the vehicle provides an input that is operable to affect how or when the transmission changes the one or more gears of the transmission; and how sluggish an engine of the vehicle performs when the driver provides an input that is operable to affect the operation of the engine. The method where the vehicle is an autonomous vehicle. The method where the parameter data is determined by a server that is communicatively coupled to the vehicle to provide the parameter data to the vehicle via a wireless network. The method where the server includes code and routines that are operable, when executed by a processor, to analyze a simulation generated by a game engine, where the simulation includes a virtual vehicle that is configured to replicate the performance of the vehicle component whose performance is affected by the vehicle fluid that is contaminated by water, where the code and routines cause the processor to analyze the simulation to generate the parameter data. The method further including modifying the set of parameters based on the parameter data and operating the vehicle with the ADAS system engaged subsequent to modifying the set of parameters for the ADAS system based on the parameter data. Implementations of the described techniques may include hardware, a method or process, or computer software on a computer-accessible medium.

One general aspect includes a system of a vehicle for modifying a performance of a vehicle component whose performance is affected by a vehicle fluid that is contaminated by water, the system including: a refractometer mounted proximate to the vehicle fluid and operable to record sensor data describing a refractometry measurement for the vehicle fluid; an ADAS system including a set of parameters that control an operation of the ADAS system; an onboard vehicle computer system that is communicatively coupled to the refractometer and the ADAS system, the onboard vehicle computer system including a non-transitory memory storing computer code which, when executed by the onboard vehicle computer system, causes the onboard vehicle computer system to: determine contamination data for the vehicle fluid based on the sensor data and the refractometry measurements described by the sensor data, where the contamination data describes an amount of water present in the vehicle fluid and indicates that the vehicle fluid is contaminated by water; and update the set of parameters for the ADAS system based on parameter data that is configured to modify the operation of the ADAS system to compensate for the amount of water present in the vehicle fluid so that vehicle component performs as though the vehicle fluid is substantially not contaminated by water. Other embodiments of this aspect include corresponding computer systems, apparatus, and computer programs recorded on one or more computer storage devices, each configured to perform the actions of the methods.

Implementations may include one or more of the following features. The system where the vehicle fluid is selected from a group that consists of: engine oil; brake fluid; fuel; power steering fluid; and transmission fluid. The system where the vehicle component is selected from a group that consists of: an engine; a brake; a brake line; a fuel injector; a fuel line; a power steering unit; and a transmission. The system where the ADAS system is a vehicular system that is operable to perform or control a performance of one or more of the following vehicle functions: how easily a steering wheel of the vehicle is turned by a driver of the vehicle; how much resistance the steering wheel provides to the driver when the driver turns the steering wheel; how readily a braking system of the vehicle decelerates when the driver depresses a braking pedal of the vehicle; how readily an engine of the vehicle accelerates when the driver of the vehicle depresses an accelerator of the vehicle; how aggressive or passive a transmission of the vehicle changes one or more gears of the transmission when the driver of the vehicle provides an input that is operable to affect how or when the transmission changes the one or more gears of the transmission; and how sluggish an engine of the vehicle performs when the driver provides an input that is operable to affect the operation of the engine. The system where the vehicle is an autonomous vehicle. The system where the parameter data is determined by a server that is communicatively coupled to the vehicle to provide the parameter data to the vehicle via a wireless network. The system where the server includes code and routines that are operable, when executed by a processor, to analyze a simulation generated by a game engine, where the simulation includes a virtual vehicle that is configured to replicate the performance of the vehicle component whose performance is affected by the vehicle fluid that is contaminated by water, where the code and routines cause the processor to analyze the simulation to generate the parameter data. The system where the non-transitory memory stores further computer code which, when executed by the onboard vehicle computer system, causes the onboard vehicle computer system to modify the set of parameters based on the parameter data and operate the vehicle with the ADAS system engaged subsequent to modifying the set of parameters for the ADAS system based on the parameter data. Implementations of the described techniques may include hardware, a method or process, or computer software on a computer-accessible medium.

One general aspect includes a computer program product including a non-transitory memory of an onboard vehicle computer system of a vehicle storing computer-executable code that, when executed by the onboard vehicle computer system, causes the onboard vehicle computer system to: record sensor data describing refractometry measurements for a vehicle fluid; determine contamination data for the vehicle fluid based on the sensor data and the refractometry measurements described by the sensor data, where the contamination data describes an amount of water present in the vehicle fluid and indicates that the vehicle fluid is contaminated by water; and analyze the contamination data to determine parameter data describing modifications for a set of parameters for an ADAS system that control an operation of the ADAS system, where the parameter data is operable to update the set of parameters and thereby modify the operation of the ADAS system to compensate for the amount of water present in the vehicle fluid so that vehicle component performs as though the vehicle fluid is substantially not contaminated by water. Other embodiments of this aspect include corresponding computer systems, apparatus, and computer programs recorded on one or more computer storage devices, each configured to perform the actions of the methods.

Implementations may include one or more of the following features. The computer program product where the vehicle fluid is selected from a group that consists of: engine oil; brake fluid; fuel; power steering fluid; and transmission fluid. The computer program product where the vehicle component is selected from a group that consists of: an engine; a brake; a brake line; a fuel injector; a fuel line; a power steering unit; and a transmission. The computer program product where the ADAS system is a vehicular system that is operable to perform or control a performance of one or more of the following vehicle functions: how easily a steering wheel of the vehicle is turned by a driver of the vehicle; how much resistance the steering wheel provides to the driver when the driver turns the steering wheel; how readily a braking system of the vehicle decelerates when the driver depresses a braking pedal of the vehicle; how readily an engine of the vehicle accelerates when the driver of the vehicle depresses an accelerator of the vehicle; how aggressive or passive a transmission of the vehicle changes one or more gears of the transmission when the driver of the vehicle provides an input that is operable to affect how or when the transmission changes the one or more gears of the transmission; and how sluggish an engine of the vehicle performs when the driver provides an input that is operable to affect the operation of the engine. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
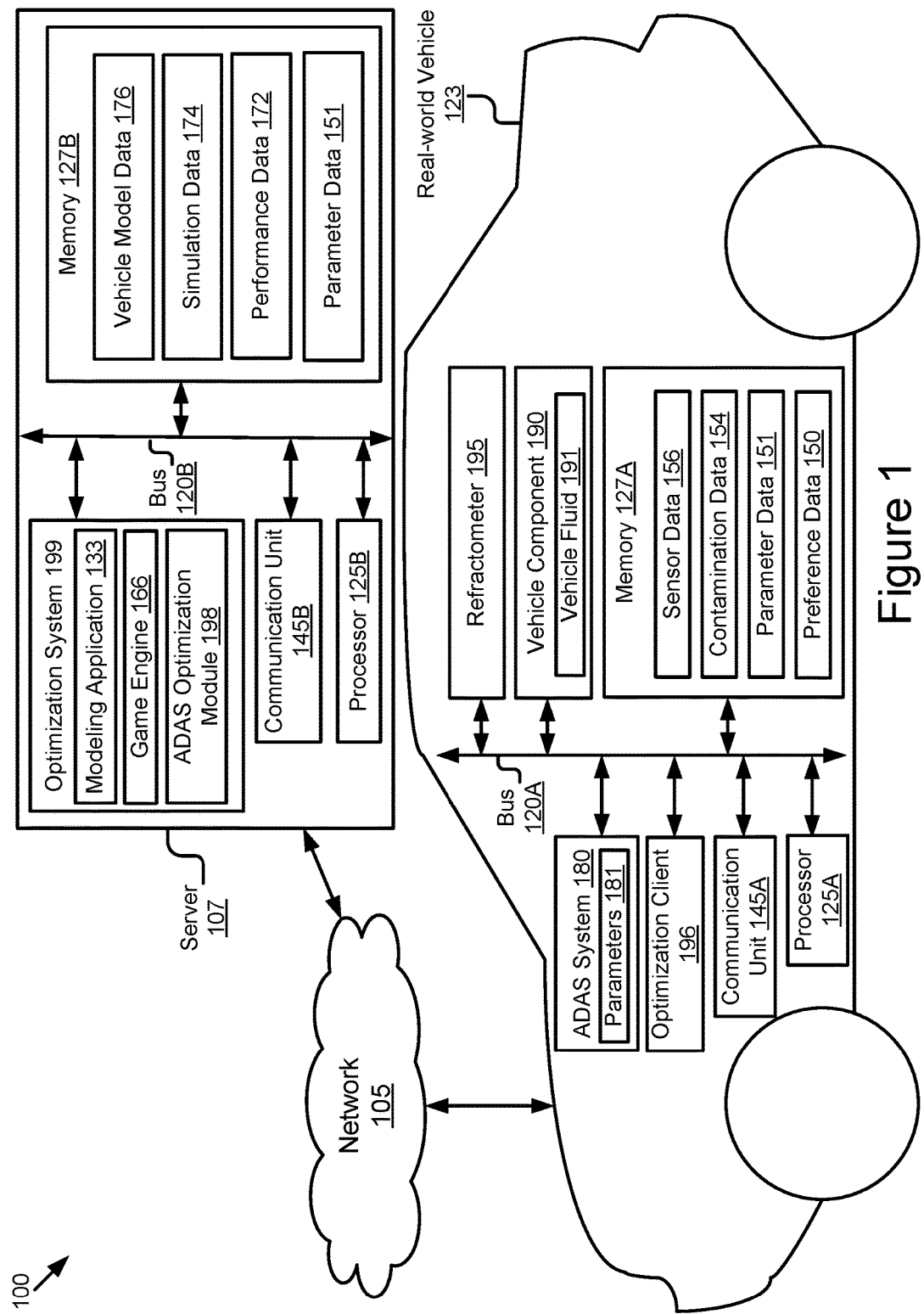
FIG. 1 is a block diagram illustrating an operating environment for an optimization system and an optimization client according to some embodiments.

The issue of water contaminated vehicle fluids is a complex problem which contributes to the decreased performance of many components inside a vehicle.

Examples of vehicle fluids which may be contaminated by water include the following: engine oil; brake fluid; fuel; power steering fluid; and transmission fluid.

Water contamination of vehicle fluids results in sluggish vehicle performance due to an inability of the contaminated vehicle fluids to transfer power as expected or desired. For example, water contamination of vehicle fluids may increase the viscosity of the contaminated vehicle fluids and corrode the components of the vehicle's engine or powertrain.

Although the actual water increase in contaminated vehicle fluids depends on a variety of factors, including the environment and conditions of the vehicle components, technicians normally report that vehicle fluids are contaminated with water by about 1% to 2% by volume with each passing year. This is a significant amount of water contamination which negatively affects the performance of the vehicle whose vehicle fluids are contaminated. The problem of water contaminated vehicle fluids gets worse with every passing year for each vehicle a manufacturer sells unless the vehicle fluids are completely replaced on an annual basis, a remedy which almost never happens and would be expensive from the standpoint of financial costs and customer convenience.

Some proposed solutions to the problem of water contaminated vehicle fluids may include the following: (1) a first proposed solution including relying on routine scheduled maintenance or unscheduled maintenance due to a component failure to prompt a driver to bring their vehicle in for maintenance so that contaminated vehicle fluids may be discovered; or (2) a second proposed solution including using onboard vehicle sensors to automatically detect the presence of contaminated vehicle fluids using onboard technology without ever doing anything so solve the problem.

Both of these proposed solutions are unacceptable since, for example: the first proposed solution does nothing to address the cumulative effects and resulting customer unhappiness with the manufacturer's "brand" during the period between maintenance events; and with the second proposed solution, the problem of decreased vehicle performance is never actually corrected without requiring the driver to bring their vehicle to a facility for maintenance, and so, the second proposed solution has the same problems as the first proposed solution. We also know from our research that consumers rarely are willing to undergo the expense and inconvenience of regularly changing their vehicle fluids to periodically eliminate the probably of water contaminated vehicle fluids, and so, both the first proposed solution and the second proposed solution suffer from this deficiency as well.

Described herein are embodiments of a system that is operable to modify the parameters for one or more ADAS systems of a vehicle to compensate for measured water contamination of one or more vehicle fluids of the vehicle. In some embodiments, the system described herein includes: (1) an optimization system of a server; and (2) an optimization client of a vehicle. The optimization system and the optimization client wireless communicate with one another via a wireless network. The optimization system and the optimization client work together to solve the problem of water contamination of vehicle fluids negatively affecting the performance of vehicle components, thereby resulting in the performance of the vehicle components providing an unsatisfactory experience for a driver of the vehicle.

The system described herein includes numerous benefits over the proposed solutions mentioned above. For example, the system described herein includes automated functionality that is operable to: accurately and reliably detect the presence of contaminated vehicle fluids without requiring the driver to bring their vehicle to a facility for maintenance; and modify the performance of the vehicle components so that the vehicle performs and "feels" (or "handles") like a new vehicle or a vehicle that does not have any water contaminated vehicle fluids (or substantially no water contaminated vehicle fluids) without ever modifying the amount of water contamination in the vehicle fluids or replacing or modifying any of the hardware components of the vehicle or the vehicle fluids themselves.

Accordingly, the system described herein represents a significant improvement over both of the proposed solutions because the system described herein solves the problem of driver unhappiness by automatically correcting many of the problems caused by water contaminated vehicle fluids so that the driver does not have to live with these problems over prolonged periods of time in between maintenance events. The system described herein also solves the problem of driver inconvenience and undue expenses to be paid by the driver by correcting many of the problems caused by water contaminated vehicle fluids without: (1) requiring the driver to bring their vehicle to a facility for maintenance; or (2) requiring the driver or a technician to modify the amount of water contamination in the vehicle fluids or replacing or modifying any of the hardware components of the vehicle or the vehicle fluids themselves.

ADAS System

Examples of an ADAS system may include one or more of the following elements of an real-world vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The ADAS system may also include any software or hardware included in a real-world vehicle that makes that vehicle be an autonomous vehicle or a semi-autonomous vehicle.

In some embodiments, the ADAS system may be a vehicular system that is operable to perform or control the performance of one or more of the following vehicle functions: the steering of the vehicle; the braking of the vehicle; the acceleration of the vehicle; the operation of a transmission of the vehicle; and how aggressive or passive (e.g., fast or slow, respectively) the transmission changes one or more gears of the transmission. In this way, the ADAS system modifies the operation of an autonomous or semi-autonomous vehicle.

In some embodiments, the ADAS system may be a vehicular system that is operable to perform or control the performance of one or more of the following vehicle functions: how easily a steering wheel of the vehicle is turned by a driver of the vehicle; how much resistance the steering wheel provides to the driver when the driver attempts to turn the steering wheel; how readily a braking system of the vehicle decelerates or stops the vehicle when the driver depresses a braking pedal of the vehicle; how readily the engine of the vehicle accelerates when the driver of the vehicle depresses an accelerator of the vehicle; how aggressive or passive (e.g., fast or slow, respectively) the transmission changes one or more gears of the transmission when the driver of the vehicle provides an input that is operable to affect how or when the transmission changes the one or more gears of the transmission; and how sluggish an engine of the vehicle performs when the driver provides an input that is operable to affect the operation of the engine. In this way, an ADAS system of the vehicle is operable to affect the performance or operation of one or more vehicle components (or their apparent performance as viewed from the perspective of the driver of the vehicle), including, for example: a power steering pump of the vehicle; a braking system of the vehicle; a fuel line of the vehicle; a fuel injector of the vehicle; a transmission of the vehicle; and an engine of the vehicle.

Example Overview

The system described herein automatically (1) detects the presence of water contaminated vehicle fluids in a real-world vehicle and (2) dynamically update one or more ADAS systems of the real-world vehicle with new ADAS parameters so that the vehicle performs and handles like a new vehicle or a vehicle with no water contaminated vehicle fluids (or substantially no water contaminated vehicle fluids) when the one or more ADAS systems are activated.

The system described herein uses refractometers in the real-world vehicle to detect the percentage of water existing inside the vehicle fluids of the real-world vehicle. The system described herein then wirelessly transmits "contamination data" from the real-world vehicle to a cloud server. The contamination data describes (1) the different vehicle fluids that are contaminated for the real-world vehicle and (2) the degree of contamination for each of these fluids.

The system described herein includes a modeling application and a game engine present of the cloud server.

The modeling application includes any Modelica-based modeling application. The modeling application may include CarSim (distributed by Mechanical Simulation Corporation or Ann Arbor, Mich.), MapleSim (distributed by Maplesoft of Waterloo, Ontario) or any other Modelica-based modeling application.

The game engine may be a Unity-based game engine (such as the Unity game engine distributed by Unity Technology of San Francisco, Calif.), or any other game engine operable, when executed by a processor, to generate a digital simulation (herein "simulation") for testing and monitoring the operation of a virtual vehicle that represents a real-world vehicle that exists in the real-world.

The modeling application includes code and routines that are operable, when executed by a processor, to generate vehicle model data that describes a vehicle model. The vehicle model data includes data necessary to cause the game engine to generate a virtualized version of the real-world vehicle.

The modeling application is modified so that it includes a plugin. The plugin includes code and routines that are operable, when executed by a processor, to analyze the contamination data. The plugin determines updates for the vehicle model data based on the contamination data. These updates are configured to modify the vehicle model data so that a virtual vehicle generated by the game engine performs like the real-world vehicle which includes the contaminated vehicle fluids as described by the contamination data. The plugin then modifies the vehicle model data based on the updates calculated by the plugin. Once modified, the vehicle model data is operable to cause a virtual vehicle included in the simulation provided by the game engine to perform like the real-world vehicle in its current state, which includes the water contaminated vehicle fluids described by the contamination data.

The system described herein includes an ADAS optimization module that is executed on a server along with the game engine and the modeling application. The ADAS optimization module (1) analyzes the performance of the virtual vehicle built based on the modified vehicle model in one or more simulations and (2) determines parameter data that describes a new set of optimized ADAS parameters for the real-world vehicle. These optimized ADAS parameters described by the parameter data are configured to modify the operation of one or more ADAS systems of the real-world vehicle so that, when these ADAS systems are activated, the real-world vehicle performs and handles like a new vehicle or a vehicle whose vehicle fluids are not contaminated (or substantially not contaminated).

The system described herein wirelessly transmits the parameter data from the server to the real-world vehicle. The system described herein uses the parameter data the parameters of one or more ADAS systems of the real-world vehicle. The system described herein does not make any changes to the existing algorithms of the one or more ADAS systems. Instead, the system described herein uses parameter optimization to increase the performance of the real-world vehicle whose vehicle fluids are contaminated by water.

The driver of the real-world vehicle may schedule regular updates to the parameters of the ADAS systems of the real-world vehicle so that the real-world vehicle continues to operate like a new vehicle or a vehicle whose vehicle fluids are at least substantially not water contaminated.

Referring to FIG. 1, depicted is an operating environment 100 for an optimization system 199 and an optimization client 196 according to some embodiments. The operating environment 100 may include a real-world vehicle 123 (herein "vehicle 123" if singular, or "vehicles 123" if plural) and a server 107. These elements may be communicatively coupled to one another via a network 105. Although one vehicle 123, one server 107 and one network 105 are depicted in FIG. 1, in practice the operating environment 100 may include one or more vehicles 123, one or more servers 107 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include 3G, 4G, LTE, LTE-V2X, VoLTE or any other mobile data network or combination of mobile data networks. Further, the network 105 may include one or more IEEE 802.11 wireless networks.

The network 105 may include one or more communication channels shared among the vehicle 123 and the server 107. The communication channel may include DSRC, LTE-V2X, full-duplex wireless communication or any other wireless communication protocol. For example, the network 105 may be used to transmit a DSRC message, a DSRC probe, a BSM or a full-duplex message including any of the data described herein.

The vehicle 123 is any type of vehicle. For example, the vehicle 123 is one of the following types of vehicles: a car; a truck; a sports utility vehicle; a bus; a semi-truck; a drone or any other roadway-based conveyance.

In some embodiments, the vehicle 123 is an autonomous vehicle or a semi-autonomous vehicle. For example, the vehicle 123 includes an ADAS system 180. The ADAS system 180 may be operable provide some or all of the functionality that provides autonomous functionality. The vehicle 123 may include a plurality of different ADAS systems 180.

In some embodiments, the vehicle 123 includes one or more of the following elements: a processor 125A; a memory 127A; a communication unit 145A; the ADAS system 180; a refractometer 195; a vehicle component 190; a vehicle fluid 191; and the optimization client 196. These elements of the vehicle 123 are communicatively coupled to one another via a bus 120A. Although only one processor 125A, one memory 127A, one communication unit 145A, one ADAS system 180, one refractometer 195, one vehicle component 190 and one vehicle fluid 191 are depicted in FIG. 1, in practice the vehicle 123 may include one or more processors 125A, one or more memories 127A, one or more communication units 145A, one or more ADAS systems 180, one or more refractometers 195, one or more vehicle components 190 and one or more vehicle fluids 191.

For example, the vehicle 123 may include a plurality of refractometers 195, a plurality of different vehicle fluids 191 and a plurality of different vehicle components 190, wherein the different vehicle fluids 191 affect the operation of the different vehicle components 190 and each vehicle fluid 191 is measured by its own refractometer 195. In another example, the performance of a single vehicle component 190 may be modified by a plurality of different ADAS systems 180.

The server 107 is a processor-based computing device. For example, the server 107 may include one or more of the following types of processor-based computing devices: a personal computer; a laptop; a mainframe; or any other processor-based computing device that is operable to function as a server. The server 107 may include a hardware server.

In some embodiments, the server 107 includes one or more of the following elements: a processor 125B; a memory 127B; a communication unit 145B; and an optimization system 199. These elements of the server 107 are communicatively coupled to one another via a bus 120B.

The processor 125A of the vehicle 123 and the processor 125B of the server 107 may be referred to herein collectively or individually as the "processor 125" since, for example, the processor 125A of the vehicle 123 provides similar functionality to the components of the vehicle 123 as does the processor 125B of the server 107. For similar reasons, the description provided herein uses the following terms when referring to elements that are common to the vehicle 123 and the server 107: the "memory 127" when referring to the memory 127A and the memory 127B, collectively or individually; and the "communication unit 145" when referring to the communication unit 145A and the communication unit 145B, collectively or individually.

The vehicle 123 and the server 107 are now described.
Vehicle 123

In some embodiments, the processor 125 and the memory 127 may be elements of an onboard vehicle computer system. The onboard vehicle computer system may be operable to cause or control the operation of one or more of the following elements: the optimization client 196, the ADAS system 180, the refractometer 195; the vehicle component 190; the vehicle fluid 191; the communication unit 145; and the memory 127. The onboard vehicle computer system may be operable to access and execute the data stored on the memory 127 to provide the functionality described herein for the optimization client 196. The onboard vehicle computer system may be operable execute the optimization client 196 which causes the onboard vehicle computer system to execute one or more of the steps of the method 300 described below with reference to FIGS. 3A and 3B.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 stores instructions or data that may accessed and executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random access memory (virtual RAM). The vehicle 123 may include one or more memories 127.

The memory 127 of the vehicle 123 may store one or more of the following elements: sensor data 156; contamination data 154; parameter data 151; and preference data 150.

The sensor data 156 includes digital data that describes one or more measurements recorded by the refractometer 195. For example, the optimization client 196 includes software which, when executed by the processor 125, causes the refractometer 195 to record the sensor data 156 at intervals determined by the optimization client 196.

In some embodiments, the measurements described by the sensor data 156 describe an amount of water present the vehicle fluid 191 for a vehicle component 190. For example, the sensor data 156 describes a measurement of a refractive index for a vehicle fluid 191 as measured by the refractometer 195. The measurement of the refractive index for the vehicle fluid as measured by the refractometer 195 may be described herein as a "refractometry measurement." The vehicle fluid 191 may be contaminated with water, and this measurement may indicate or be used to determine a percentage of water present in the vehicle fluid 191.

In practice, the vehicle 123 may include a plurality of refractometers 195 which each record sensor data 156 for a plurality of different vehicle fluids 191 affecting the operation of a plurality of different vehicle components 190. In some embodiments, sensor data 156 describes the measurements recorded by a plurality of refractometers 195 for a plurality of different vehicle fluids 191. Each refractometer 195 may generate a discrete set of sensor data 156. Each discrete set of sensor data 156 may correspond to a discrete instance of vehicle fluids 191. Each discrete set of sensor data 156 may include one or more bits of data that identify which particular vehicle fluid 191 is being measured and described by the sensor data 156. In this way, the sensor data 156 is configured to describe the refractometer 195 measurements for a plurality of different vehicle fluids 191 in a way that allows the different vehicle fluids 191 to be analyzed and considered individually by the optimization client 196 when generating the contamination data 154.

The contamination data 154 includes digital data that describes the water contamination present in discrete instances vehicle fluids 191 and the percentage of water present in discrete instances of vehicle fluids 191 by volume. For example, the optimization client 196 includes software that, when executed by the processor 125, causes the processor 125 to analyze discrete instances of the sensor data 156 to determine the contamination data 154 for that discrete instance of sensor data 156. The optimization client 196 includes software that, when executed by the processor 125, causes the communication unit 145 of the vehicle 123 to wirelessly transmit the contamination data 154 to the server 107 via the network 105. As described in more detail below, the optimization system 199 of the server 107 may analyze the contamination data 154 and provide, to the vehicle 123, parameter data 151 that is responsive to one or more discrete instances of contamination data 154.

The parameter data 151 includes digital data that describes new or updated parameters 181 for one or more ADAS systems 180 of the vehicle 123. The parameter data 151 may be determined by an ADAS optimization module 198 of the server 107 responsive to analyzing the contamination data 154 and how the water contamination present in one or more vehicle fluids 191 affects the operation of one or more vehicle components 190 of the vehicle 123. The parameter data 151 may be configured by the ADAS optimization module 198 to modify the operation of one or more of the ADAS systems 180 of vehicle 123 so that, when these ADAS systems 180 are activated, the vehicle components 190 adversely affected by the water contaminated vehicle fluids 191 provide a level of performance that is similar to their performance in a new vehicle or a vehicle 123 with no vehicle fluids 191 that are contaminated by water.

The preference data 150 includes digital data that specifies an interval when the method 300 described below with reference to FIGS. 3A and 3B should be initiated so that the parameters for one or more of the ADAS systems 180 of the vehicle 123 are updated. A driver of the vehicle 123 may provide and input (e.g., via a head unit of the vehicle 123 or some other vehicular input device) that specifies the preference data 150.

The communication unit 145 transmits and receives data to and from a network 105 or to another communication channel. In some embodiments, the communication unit 145 may include a DSRC transceiver, a DSRC receiver and other hardware or software necessary to make the vehicle 123 (or some other device such as the server 107) a DSRC-enabled device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The refractometer 195 includes a refractometer devices that is mounted within the vehicle 123 to measure a vehicle fluid 191. The operation of the refractometer 195 may be controlled by the optimization client 196. The refractometer 195, once executed, may generate sensor data 156 that describes one or more refractometer measurements of the vehicle fluid 191.

The vehicle fluid 191 includes a non-water fluid of a vehicle whose presence and physical properties affect the operation of a vehicle component 190. The vehicle 123 may include a plurality of different vehicle fluids 191. Each instance of vehicle fluid 191 may be measured by a different refractometer 195. The vehicle fluid 191 may include one or more of the following: engine oil; brake fluid; fuel; power steering fluid; transmission fluid; grease; and any fluid of a vehicle 123 whose presence and physical properties affect the operation of a vehicle component 190.

The vehicle component 190 includes a component of the vehicle 123 whose operation is affected by the vehicle fluid 191. The vehicle 123 may include a plurality of different vehicle components 190. The vehicle component 190 may include one or more of the following: an engine; brakes; a brake line; a fuel injector; a fuel line; a power steering pump; a transmission; and any vehicle component 190 whose operation is affected by a vehicle fluid 191.

The ADAS system 180 may include one or more advanced driver assistance systems. The vehicle may include a plurality of ADAS systems 180. Each ADAS system 180 may affect the operation of one or more vehicle components 190. In some embodiments, the operation of a single vehicle component 190 may be affected by a plurality of ADAS systems 180.

Examples of an ADAS system 180 may include one or more of the following elements of the vehicle 123: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system. Each of these example ADAS systems 180 provide their own features and functionality that may be referred to herein as a "ADAS feature" or an "ADAS functionality," respectively.

In some embodiments, the ADAS system 180 includes any hardware or software that controls one or more operations of the vehicle 123 so that the vehicle 123 is "autonomous" or "semi-autonomous." For example, the vehicle 123 may be placed in "autonomous driving mode" using an input device of the vehicle (e.g., a touch screen of a head unit of the vehicle 123, the driver's voice which is recorded by a microphone of the vehicle 123, etc.) and one or more ADAS systems 180 of the vehicle 123 may provide an autonomous or semi-autonomous driving experience for the driver of the vehicle 123.

In some embodiments, the ADAS system 180 may be a vehicular system of the vehicle 123 that is operable to perform or control the performance of one or more of the following vehicle functions: how easily a steering wheel of the vehicle 123 is turned by a driver of the vehicle 123; how much resistance the steering wheel provides to the driver when the driver attempts to turn the steering wheel; how readily a braking system of the vehicle 123 decelerates or stops the vehicle 123 when the driver depresses a braking pedal of the vehicle; how readily the engine of the vehicle 123 accelerates when the driver of the vehicle 123 depresses an accelerator of the vehicle 123; how aggressive or passive (e.g., fast or slow, respectively) the transmission changes one or more gears of the transmission when the driver of the vehicle 123 provides an input that is operable to affect how or when the transmission changes the one or more gears of the transmission; and how sluggish an engine of the vehicle 123 performs when the driver provides an input that is operable to affect the operation of the engine. In this way, an ADAS system 180 of the vehicle 123 is operable to affect the performance or operation of one or more vehicle components 190 (or the apparent performance of the one or more vehicle components 190 as viewed from the perspective of the driver of the vehicle 123), including, for example: a power steering pump of the vehicle 123; a braking system of the vehicle 123; a fuel line of the vehicle 123; a fuel injector of the vehicle 123; a transmission of the vehicle 123; and an engine of the vehicle 123.

An ADAS system 180 includes a non-transitory memory (or is communicatively coupled to a non-transitory memory such as the memory 127) that stores parameters 181 for the ADAS system 180. The parameters 181 include digital data that affect or control the operation of the ADAS system 180. The preference data 150 may modify the parameters 181 or one or more variables of the parameters 181.

For example, the parameters 181 for an ACC system may affect how closely the vehicle 123 follows behind a lead vehicle when the ACC system is engaged. The parameters 181 for the ACC system may specify that the ACC system control the operation of the vehicle 123 so that the vehicle 123 maintains a fifteen feet gap between the vehicle 123 and the lead vehicle. These parameters 181 may modified by the optimization client 196 based on the parameter data 151. For example, the optimization client 196 may modify the parameters 181 for the ACC system to specify that the ACC system control the operation of the vehicle 123 so that the vehicle 123 maintains a five-foot gap between the vehicle 123 and the lead vehicle, instead of the fifteen-foot gap that was previously specified by the parameters 181 of the ACC system. Accordingly, the parameters 181 for the ACC system affect or control the operation of the ADAS system 180, and the parameter data 151 may modify these parameters 181. In this way, a particular set of parameters 181 for a particular ADAS system 180 affect or control the operation of that ADAS system 180. Each ADAS system 180 of the vehicle 123 includes parameters 181 that are modifiable by the optimization client 196 based on the parameter data 151.

The optimization client 196 includes code or routines that, when executed by the processor 125, causes a refractometer 195 to measure a vehicle fluid 191 and record sensor data 156 to the memory 127 that describes these measurements. The optimization client 196 includes code or routines that, when executed by the processor 125, causes the processor 125 to analyze the sensor data 156 to generate the contamination data 154 as described above. The optimization client 196 includes code or routines that, when executed by the processor 125, causes the communication unit 145 to transmit the contamination data 154 to the server 107 via the network 105. The optimization client 196 includes code or routines that, when executed by the processor 125, causes communication unit 145 to receive the parameter data 151 from the network 105 and store the parameter data 151 in the memory 127. The optimization client 196 includes code or routines that, when executed by the processor 125, retrieves the parameter data 151 from the memory 127 and modifies the parameters 181 for an ADAS system 180 based on the parameter data 151. The optimization client 196 includes code or routines that, when executed by the processor 125, causes the ADAS system 180 to be activated during the operation of the vehicle 123.

In this way, the optimization client 196 of the vehicle 123 is operable to modify the performance of a vehicle component 190 whose performance is affected by a vehicle fluid 191 that is contaminated by water.

For example, assume the fuel of the vehicle is contaminated by water. Ordinarily this would result in sluggish engine performance and other dilatory effects resulting from the water contamination of the fuel. The parameter data 151 may include data for modifying the parameters 181 of one or more ADAS systems 180 that affect the operation of the fuel injector or the engine so that one or more of the fuel injector and the engine do perform sluggishly or cause the driver of the vehicle 123 to experience the dilatory effects resulting from the water contamination of the fuel.

In another example, the transmission fluid is contaminated by water. Ordinarily this would result in sluggish transmission performance and other dilatory effects resulting from the water contamination of the transmission fluid. The parameter data 151 may include data for modifying the parameters 181 of one or more ADAS systems 180 that affect the operation of the transmission so that the transmission does not perform sluggishly or cause the driver of the vehicle 123 to experience the dilatory effects resulting from the water contamination of the transmission fluid.

In another example, the brake fluid is contaminated by water. Ordinarily this would result in sluggish performance of the vehicle's braking system and other dilatory effects resulting from the water contamination of the brake fluid. The parameter data 151 may include data for modifying the parameters 181 of one or more ADAS systems 180 that affect the operation of the braking system so that the braking system does not perform sluggishly or cause the driver of the vehicle 123 to experience the dilatory effects resulting from the water contamination of the brake fluid.

In another example, the power steering fluid is contaminated by water. Ordinarily this would result in sluggish performance of the vehicle's power steering pump and other dilatory effects resulting from the water contamination of the power steering fluid. The parameter data 151 may include data for modifying the parameters 181 of one or more ADAS systems 180 that affect the operation of the power steering pump so that the power steering pump does not perform sluggishly or cause the driver of the vehicle 123 to experience the dilatory effects resulting from the water contamination of the power steering fluid.

In another example, the brake fluid is contaminated by water. Ordinarily this would result in sluggish performance of the vehicle's braking system and other dilatory effects resulting from the water contamination of the brake fluid. The parameter data 151 may include data for modifying the parameters 181 of one or more ADAS systems 180 that affect the operation of the braking system so that the braking system does not perform sluggishly or cause the driver of the vehicle 123 to experience the dilatory effects resulting from the water contamination of the brake fluid.

In another example, if the power steering fluid is contaminated with water, thereby adversely affecting the performance of the power steering pump, then the parameter data 151 may include data for modifying the parameters 181 of one or more ADAS systems 180 of the vehicle 123 which control the operation of the steering wheel when the vehicle 123 is in an autonomous driving mode assist the driver of the vehicle 123 to turn the steering wheel in a degree that is calculated by the ADAS optimization module 198 to assist the driver in turning the steering wheel without the driver knowing that the ADAS system 180 is assisting them. In another example, the parameter data 151 may include data for modifying the parameters 181 of the one or more ADAS systems 180 to increase an amplitude of electricity provided to the power steering pump to increase its power output and thereby overcome the decreased performance of the power steering pump that would have resulted from the power steering fluid being contaminated by water.

In another example, if the brake fluid is contaminated with water, thereby adversely affecting the performance of the braking system, then the parameter data 151 may include data for modifying the parameters 181 of one or more ADAS systems 180 of the vehicle 123 which control the operation of the braking system when the vehicle 123 is in an autonomous driving mode assists the driver of the vehicle 123 to modify the operation of the braking system (e.g., increasing an amplitude of electricity provided to a brake pump) to compensate for the decrease in performance of the braking system caused by the brake fluid being contaminated by water.

In another example, fuel of the vehicle 123 is contaminated with water, thereby adversely affecting the performance of the fuel pump or engine of the vehicle 123, then the parameter data 151 may include data for modifying the parameters 181 of one or more ADAS systems 180 of the vehicle 123 which control the operation of the fuel pump when the vehicle 123 is in an autonomous driving mode increase an amplitude of electricity provided to a fuel pump (e.g., increasing an amplitude of electricity provided to a fuel pump) to compensate for the decrease in performance of the fuel pump or the engine caused by the fuel being contaminated by water.

In another example, if the transmission fluid is contaminated with water, thereby adversely affecting the performance of the transmission, then the parameter data 151 may include data for modifying the parameters 181 of one or more ADAS systems 180 of the vehicle 123 which control the operation of the transmission when the vehicle 123 is in an autonomous driving mode assists the driver of the vehicle 123 to change the gears of the transmission in a degree that is calculated by the ADAS optimization module 198 to assist the driver in changing the gears of the transmission without the driver knowing that the ADAS system 180 is assisting them. In another example, the parameter data 151 may include data for modifying the parameters 181 of one or more ADAS systems 180 to increase an amplitude of electricity provided to the transmission to increase its power output and thereby overcome the decreased performance of the transmission that would have resulted from the transmission fluid being contaminated by water.

These examples provided in the preceding paragraphs concerning how the parameter data 151 may modify the parameters 181 of one or more ADAS systems 180 to compensate for the dilatory effects resulting from water contamination of a vehicle fluid 191 are intended to be illustrative and not limiting.

In some embodiments, the optimization client 196 of the vehicle 123 may be implemented using hardware including a field-programmable gate array ("FPGA") or an application-specific integrated circuit ("ASIC"). In some other embodiments, the optimization client 196 may be implemented using a combination of hardware and software. The optimization client 196 may be stored in a combination of the devices (e.g., servers or other devices).

The optimization client 196 is described in more detail below with reference to FIGS. 3A and 3B.

Server 107

In some embodiments, the server 107 is a cloud server that includes one or more of the following elements: an optimization system 199; a processor 125; a memory 127; and a communication unit 145. The following elements of the server 107 are the same or similar to those described above for the vehicle 123, and so, the descriptions of these elements will not be repeated here: the processor 125; the memory 127; and the communication unit 145.

The memory 127 of the server 107 stores one or more of the following elements: vehicle model data 176; simulation data 174; performance data 172; and parameter data 151.

The vehicle model data 176 includes all the digital data necessary to cause the game engine 166 to generate a virtual version of the vehicle 123 in a simulation provided by the game engine 166.

In some embodiments, the memory 127 may store two versions of the vehicle model data 176. The first version of the vehicle model data 176 may describe a vehicle design for the vehicle 123 when the vehicle does not include any vehicle fluids 191 that are contaminated by water. This first version of the vehicle model data 176 may be determined by the modeling application 133 or inputted to the memory 127 by a human user of the server 107, such as a vehicle design engineer. The second version of the vehicle model data 176 may include the first version of the vehicle model data 176 which is modified based on the contamination data 154 received from the network 105 by the communication unit 145 of the server 107.

For example, the modeling application 133 may include a plug-in. The plug-in includes code and routines that are operable, when executed by the processor 125 of the server 107, to cause the processor 125 of the server 107 to analyze the contamination data 154 and determine modifications for the first version of the vehicle model data 176. The plug-in, when executed by the processor 125 of the server 107, causes the processor 125 to apply these modifications to the vehicle model data 176 to yield the second version of the vehicle model data 176. The second version of the vehicle model data 176, as generated by the plug-in, is operable, when included in the simulation data 174 that is executed by the game engine 166, to cause the game engine 166 to generate a simulation including a virtual vehicle that accurately simulates the performance of the vehicle 123 while experiencing the degraded performance of one or more vehicle components 190 due to the effect of the one or more vehicle fluids 191 that are contaminated by water as described by the contamination data 154.

The simulation data 174 includes all the digital data necessary to create static and dynamic objects in the simulation provided by the game engine 166. The simulation data 174 may be operable to cause the static and dynamic objects included in the simulation to have realistic behavior and realistic physical properties. The simulation data 174 may be generated by the game engine 166 based at least in part on vehicle model data 176 which is modified based on the contamination data 154 so that the vehicle model data 176 accurately reflects the current state of the vehicle 123, which includes one or more vehicle fluids 191 that are contaminated by water.

The performance data 172 is digital data describing the performance of the virtual vehicle while operating in the simulation provided by the game engine 166. For example, the performance data 172 describes how discrete virtualized vehicle components included in the virtual vehicle performed under certain situations presented to the virtual vehicle during the simulation. The performance data 172 may be generated by the game engine 166 based on the operation of the virtual vehicle during the course of one or more simulations provided by the game engine 166 based on the simulation data 174.

The parameter data 151 was described above with reference to the vehicle 123, and so, that description will not be repeated here.

The optimization system 199 includes one or more of the following elements: a modeling application 133; a game engine 166; an ADAS optimization module 198.

The modeling application 133 may include code and routines that are operable, when executed by the processor 125 of the server 107, to generate the one or more vehicle models that describe the hardware and software design of the vehicle 123, which may be collectively revered to as a "vehicle design" for the vehicle 123. For example, the modeling application 133 may generate and modify the vehicle model data 176.

Initially, the vehicle model data 176 may be based on the vehicle design of the vehicle 123 without water contaminated vehicle fluids. Such vehicle model data 176 may be inputted as one or more files updated to the optimization system 199 by a vehicle design engineer or some other administrator of the server 107. This is described above as the first version of the vehicle model data 176. However, as the vehicle fluids 191 of the vehicle 123 are contaminated by water, the vehicle model data 176 is modified by a plug-in of the modeling application 133 based on the contamination data 154 received from the network 105. This is described above as the second version of the vehicle model data 176. In this way, the vehicle design described by the vehicle model data 176 is modified by the modeling application 133 (or a plug-in of the modeling application 133) to accurately reflect the current state of the vehicle 123 in the real-world as described by the contamination data 154.

In some embodiments, the optimization system 199 includes one or more modeling applications 133. Different modeling applications 133 may be specialized for generating or modifying particular types of digital models (herein "models") which are included in the vehicle design described by the vehicle model data 176. For example, the optimization system 199 may include one or more of the following modeling applications: Dymola (produced by Dassault Systemes AB, Lund of Velizy-Villacoublay, France, and used to generate a vehicle model); MapleSim (produced by Maplesoft of Waterloo, Ontario, and used to generate a vehicle model); Simulink (produced by MathWorks of Natick, Mass., and used to generate models of a the one or more ADAS systems 180 of the vehicle); and PreScan (produced by TASS International of the Netherlands, and used to generate models of a the one or more ADAS systems 180 of the vehicle), etc.

The modeling application 133 may also generate other models used by the game engine 166. For example, the modeling application 133 may generate a model describing a virtual roadway environment for inclusion in the simulation provided by the game engine 166. The modeling application 133 may also generate a model describing virtual and static objects which are included in the simulation provided by the game engine 166.

The game engine 166 may include code and routines that are operable, when executed by the processor of the server 107, to generate a simulation based on the one or more models generated by the one or more modeling applications 133. The game engine 166 may also include software for generating the vehicle roadway model based on inputs provided by a human administrator of the server 107 or other data uploaded to the server 107 (e.g., via the network 105 or some other data uploaded to the server 107 such as via a memory card or some other non-transitory memory). An example of the game engine 166 may include the Unity game engine (produced by Unity Technologies of San Francisco, Calif.) or some other game engine.

One or more of the game engine 166 and the modeling application 133 may generate the one or more models that describe the one or more dynamic objects and the behavior of these dynamic objects.

In some embodiments, the modeling application 133 may include a plug-in that is operable to analyze the contamination data 154 received from the network 105 and modify the vehicle model data 176 based on the contamination data 154 to accurately reflect the current state of the vehicle 123.

The game engine 166 may include software that is operable, when executed by the processor of the server 107, to generate the simulation data 174. The game engine 166 may generate the simulation data 174 based on the vehicle model data 176 and other digital data that describes the different models discussed above. The simulation data 174 and the game engine 166, when executed by the processor 125, may cause the processor 125 to generate one or more simulations for testing the operation of a virtual vehicle which accurately represents the operation of vehicle 123 based on its current state as described by the contamination data 154 since the modeling application 133 (or the plug-in of the modeling application 133) has modified the vehicle model data 176 based on the contamination data 154.

In some embodiments, the game engine 166 runs one or more simulations to test and evaluate the performance of a virtual vehicle built based on the vehicle model data 176 in the one or more simulations. The game engine 166 generates the one or more simulations using the simulation data 174. The simulation data 174 is determined by the game engine 166 using the version of the vehicle model data 176 which is modified by the modeling application 133 based on the contamination data 154 received from the network 105. In this way, the simulation data 174 enables the game engine 166 to generate the one or more simulations which test the operation of the virtual vehicle with accurately represents the operation of vehicle 123 based on its current state as described by the contamination data 154. In other words, the virtual vehicle, when simulated by the game engine 166, accurately simulates the performance of the vehicle 123 while experiencing the degraded performance caused by the water contaminated vehicle fluids 191 as described by the contamination data 154. As the one or more simulations are running, the game engine 166 generates the performance data 172, which describes the performance of the virtual vehicle while operating in the one or more simulations.

The ADAS optimization module 198 includes code and routines that are operable, when executed by the processor 125 of the server 107, to analyze the performance data 172 to determine how to modify the operation of one or more ADAS systems 180 of the vehicle 123 to correct the degraded performance of one or more vehicle components 190 which is caused by the contamination of the one or more vehicle fluids 191 as described by the contamination data 154. The ADAS optimization module 198 generates the parameter data 151 based on this analyzes of the performance data 172.

In some embodiments, ADAS optimization module 198 includes code and routines that are operable, when executed by the processor 125 of the server 107, to (1) analyze the contamination data 154 and how the water contamination present in one or more vehicle fluids 191 affects the operation of one or more vehicle components 190 of the vehicle 123 whose performance is affected by the one or more contaminated vehicle fluids 191 and (2) generate the parameter data 151 responsive to this analysis.

In some embodiments, the ADAS optimization module 198 includes code and routines that are operable, when executed by the processor 125 of the server 107, to cause the processor 125 to analyze the performance data 172 (and optionally one or more of the first version of the vehicle model data 176, a specification for the vehicle 123 and a specification for the one or more vehicle components 190 affected by the contaminated vehicle fluids 191) to generate the parameter data 151. The parameter data 151 describes one or more parameters 181 for one or more ADAS systems 180 of vehicle 123. These one or more parameters 181 are operable to modify the operation of one or more ADAS systems 180. When these one or more parameters 181 are applied to the one or more ADAS systems 180 of the vehicle 123 (as is done by the optimization client 196), these ADAS systems 180, when activated, modify or control the operation of the one or more vehicle components 190 so that they provide a level of performance that is similar to their performance in a new vehicle or a vehicle 123 with no vehicle fluids 191 that are contaminated by water.

The specification for the vehicle 123 includes digital data that describes the vehicle design for the vehicle 123 and how its discrete vehicle components 190 operable when their operation conforms to the vehicle design. The specifications for the one or more vehicle components 190 describes the design of these vehicle components 190 and how they should operable when included in the vehicle design. In some embodiments, the specification for the vehicle 123 or the specifications for the one or more vehicle components 190 describe the level of performance that the vehicle components 190 of the vehicle 123 should provide for a new vehicle or a vehicle 123 with no vehicle fluids 191 that are contaminated by water.

In some embodiments, the optimization system 199 includes code and routines that are operable, when executed by the processor 125 of the server 107, to cause the communication unit 145 of the server 107 to transmit the parameter data 151 to the network 105. The communication unit 145 of the vehicle 123 receives the parameter data 151 from the network 105. The communication unit 145 of the vehicle 123 stores the parameter data 151 in the memory 127 of the vehicle 123 or transmits the parameter data 151 to the optimization client 196. The optimization client 196 analyzes the parameter data 151 and modifies the parameters 181 of one or more ADAS systems 180 so that they operate as described by the parameter data 151. These ADAS systems 180, when activated, modify or control the operation of the one or more vehicle components 190 so that they provide a level of performance that is similar to their performance in a new vehicle or a vehicle 123 with no vehicle fluids 191 that are contaminated by water.

Examples of modeling applications 133 and game engines 166 according to some embodiments are described in U.S.

patent application Ser. No. 15/135,135 filed on Apr. 21, 2016 and entitled "Wind Simulation Device," the entirety of which is hereby incorporated by reference. See, for example, the "virtual simulation tool" described in this application. Embodiments of this technology are also discussed in U.S. patent application Ser. No. 15/074,842 filed on Mar. 18, 2016 and entitled "Vehicle Simulation Device for Crowd-Sourced Vehicle Simulation Data," the entirety of which is hereby incorporated by reference. Embodiments of this technology are also discussed in U.S. patent application Ser. No. 15/085,644 filed on Mar. 30, 2016 and entitled "Dynamic Virtual Object Generation for Testing Autonomous Vehicles in Simulated Driving Scenarios," the entirety of which is hereby incorporated by reference. One or more of the optimization system 199 and the optimization client 196 described herein may be modified to include any of the elements described in U.S. patent application Ser. No. 15/135,135, U.S. patent application Ser. No. 15/085,644 and U.S. patent application Ser. No. 15/074,842.

In some embodiments, the optimization system 199 of the server 107 may be implemented using hardware including a FPGA or an ASIC. In some other embodiments, the optimization system 199 may be implemented using a combination of hardware and software. The optimization system 199 may be stored in a combination of the devices (e.g., servers or other devices).

Figure 2:
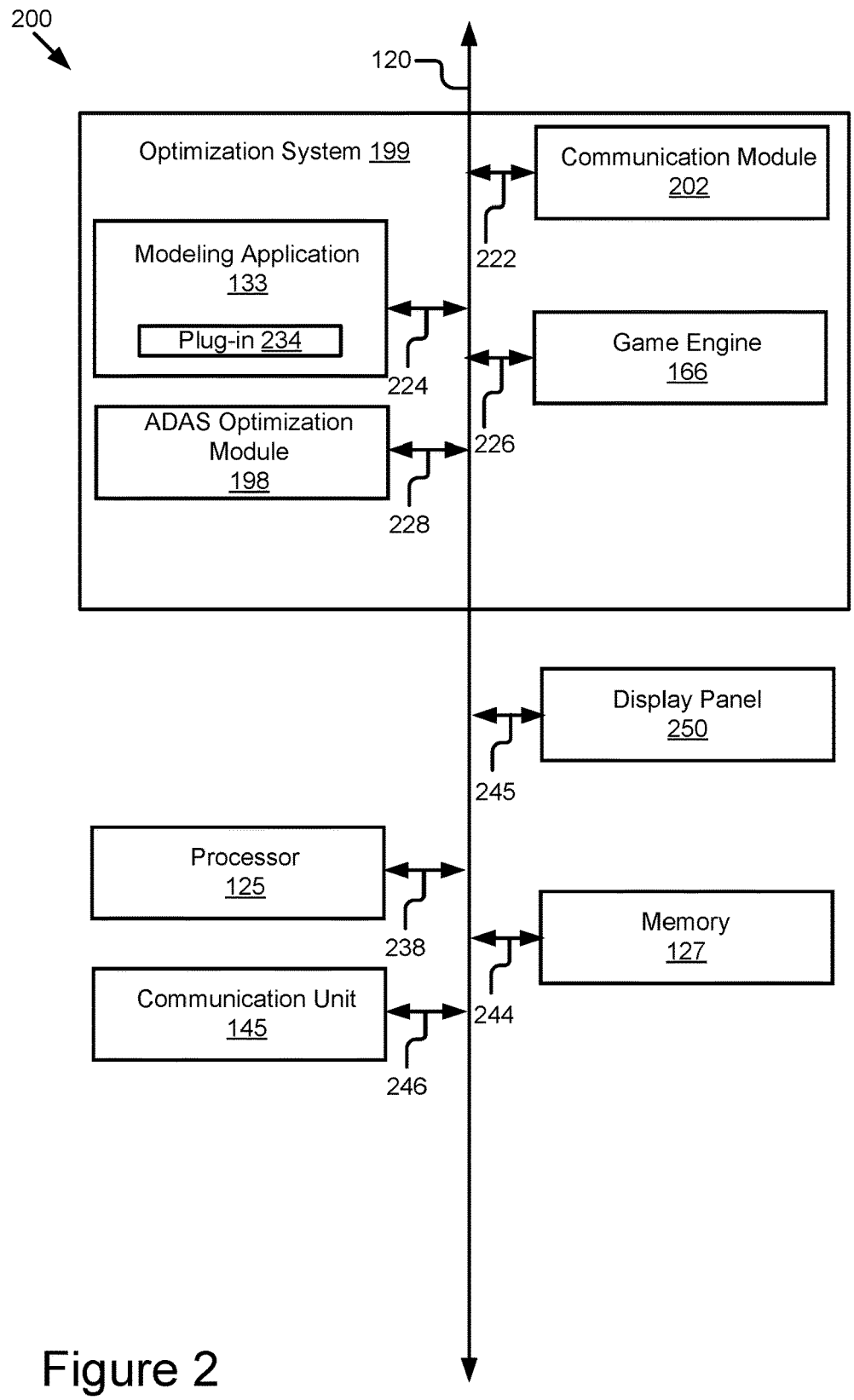
FIG. 2 is a block diagram illustrating an example computer system including the optimization system according to some embodiments.

Referring now to FIG. 2, depicted is a block diagram illustrating an example computer system 200 including an optimization system 199 according to some embodiments.

In some embodiments, the computer system 200 may include a special-purpose computer system that is programmed to perform one or more steps of a method 300 described below with reference to FIG. 3A or 3B.

In some embodiments, the computer system 200 may be an element the server 107. In some embodiments, the computer system 200 may be an onboard vehicle computer of the vehicle 123. In some embodiments, the computer system 200 may include an electronic control unit, head unit or some other processor-based computing device of the vehicle 123.

The computer system 200 may include one or more of the following elements according to some examples: the optimization system 199; the processor 125; the communication unit 145; the memory 127; and a display panel 250. The components of the computer system 200 are communicatively coupled by a bus 120.

In the illustrated embodiment, the processor 125 is communicatively coupled to the bus 120 via a signal line 238. The communication unit 145 is communicatively coupled to the bus 120 via a signal line 246. The memory 127 is communicatively coupled to the bus 120 via a signal line 244. The display panel 250 is communicatively coupled to the bus 120 via a signal line 245.

The following elements of the computer system 200 were described above with reference to FIG. 1, and so, those descriptions will not be repeated here: the processor 125; the communication unit 145; and the memory 127.

The memory 127 may store any of the data described above with reference to FIG. 1. The memory 127 may store any data necessary for the computer system 200 to provide its functionality.

In the illustrated embodiment shown in FIG. 2, the optimization system 199 includes: a communication module 202; the modeling application 133; the game engine 166; and the ADAS optimization module 198.

The communication module 202 can be software including routines for handling communications between the optimization system 199 and other components of the computer system 200. In some embodiments, the communication module 202 can be a set of instructions executable by the processor 125 to provide the functionality described below for handling communications between the optimization system 199 and other components of the computer system 200 or the operating environment 100.

The communication module 202 sends and receives data, via the communication unit 145, to and from one or more elements of the operating environment 100. For example, the communication module 202 receives or transmits, via the communication unit 145, one or more of the following elements: the contamination data 154; and the parameter data 151. The communication module 202 may send or receive any of the data or messages described above with reference to FIG. 1 or below with reference to FIGS. 3A and 3B via the communication unit 145.

In some embodiments, the communication module 202 receives data from components of the optimization system 199 and stores the data in the memory 127. For example, the communication module 202 receives a second version of the vehicle model data 176 which is modified based on the contamination data 154 and stores the second version of the vehicle model data 176 in the memory 127 of the computer system 200.

In some embodiments, the communication module 202 may handle communications between components of the optimization system 199. For example, the communication module 202 may receive vehicle model data 176 from the modeling application 133 and transmit the vehicle model data 176 to the game engine 166. The communication module 202 may receive performance data 172 from the game engine 166 and transmit the performance data 172 to the ADAS optimization module 198. The communication module 202 may receive parameter data 151 from the ADAS optimization module 198 and transmit the parameter data 151 to the communication unit 145 with instructions for the communication unit 145 to transmit the parameter data 151 to the network 105.

In some embodiments, the communication module 202 can be stored in the memory 127 of the computer system 200 and can be accessible and executable by the processor 125. The communication module 202 is adapted for cooperation and communication with the processor 125 and other components of the computer system 200 via signal line 222.

The modeling application 133 was described above with reference to FIG. 1, and so, that description will not be repeated here.

As depicted, the modeling application 133 includes a plug-in 234. The plug-in 234 includes code and routines that are operable, when executed by the processor 125, to cause the processor 125 to analyze one or more of the contamination data 154 and the first version of the vehicle model data 176 to determine the second version of the vehicle model data 176. For example, the plug-in 234 includes code and routines that are operable, when executed by the processor 125, to cause the processor 125 to analyze the contamination data 154 and determine modifications for the first version of the vehicle model data 176. The plug-in, when executed by the processor 125, causes the processor 125 to apply these modifications to the vehicle model data 176 to yield the second version of the vehicle model data 176. The second version of the vehicle model data 176 is operable, when included in the simulation data 174 that is executed by the game engine 166, to cause the game engine 166 to generate a simulation including a virtual vehicle that accurately simulates the performance of the vehicle 123 while experiencing the degraded performance of one or more vehicle components 190 due to the effect of the one or more vehicle fluids 191 that are contaminated by water as described by the contamination data 154.

In some embodiments, the modeling application 133 can be stored in the memory 127 of the computer system 200 and can be accessible and executable by the processor 125. The modeling application 133 is adapted for cooperation and communication with the processor 125 and other components of the computer system 200 via signal line 224.

The game engine 166 was described above with reference to FIG. 1, and so, that description will not be repeated here.

In some embodiments, the game engine 166 can be stored in the memory 127 of the computer system 200 and can be accessible and executable by the processor 125. The game engine 166 is adapted for cooperation and communication with the processor 125 and other components of the computer system 200 via signal line 226.

The ADAS optimization module 198 was described above with reference to FIG. 1, and so, that description will not be repeated here.

In some embodiments, the ADAS optimization module 198 can be stored in the memory 127 of the computer system 200 and can be accessible and executable by the processor 125. The ADAS optimization module 198 is adapted for cooperation and communication with the processor 125 and other components of the computer system 200 via signal line 228.

Figure 3A:
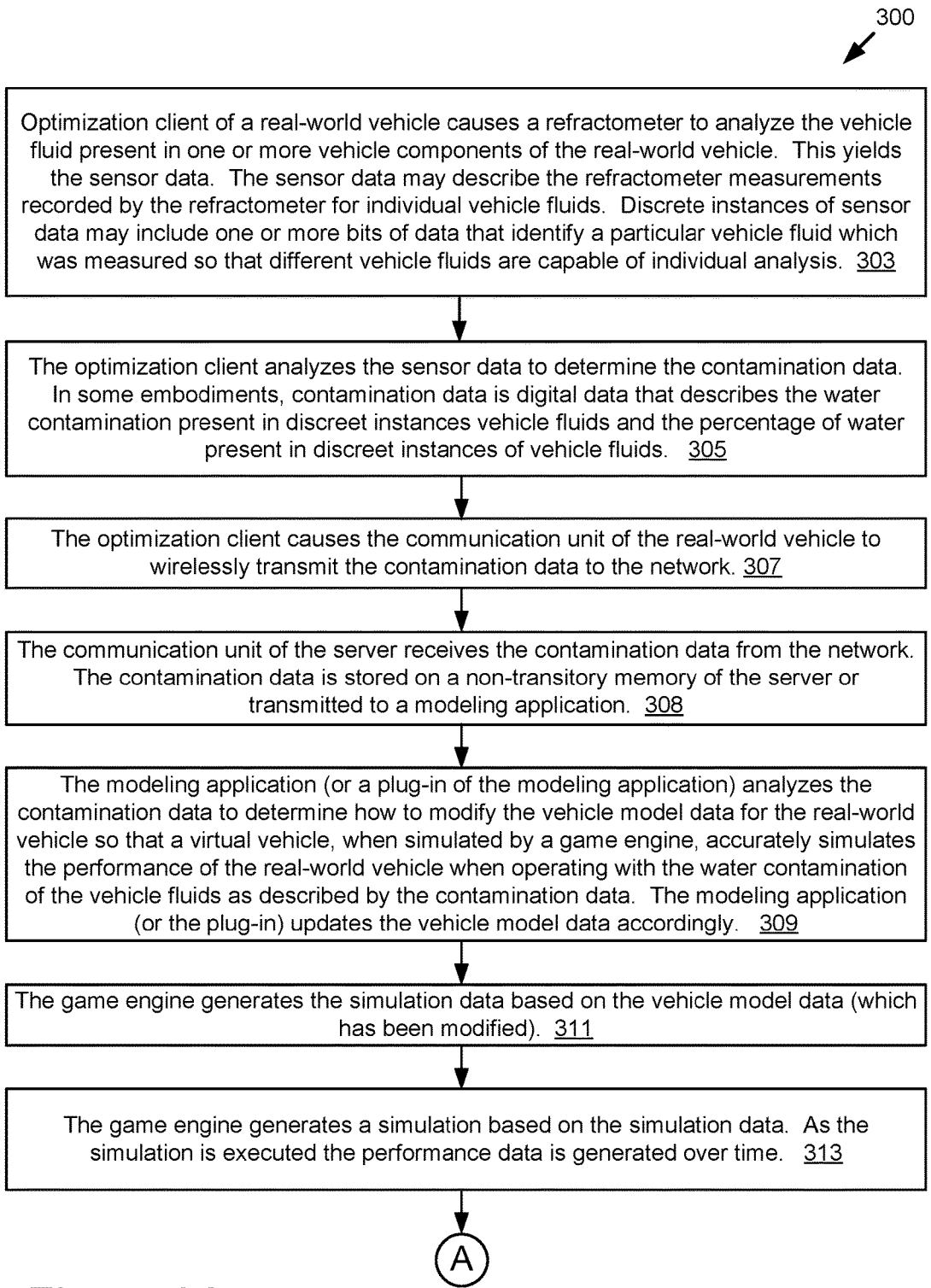
FIGS. 3A and 3B include a flowchart of an example method for modifying one or more parameters of an ADAS system for a vehicle to compensate for the water contamination of one or more vehicle fluids according to some embodiments.
Figure 3B:
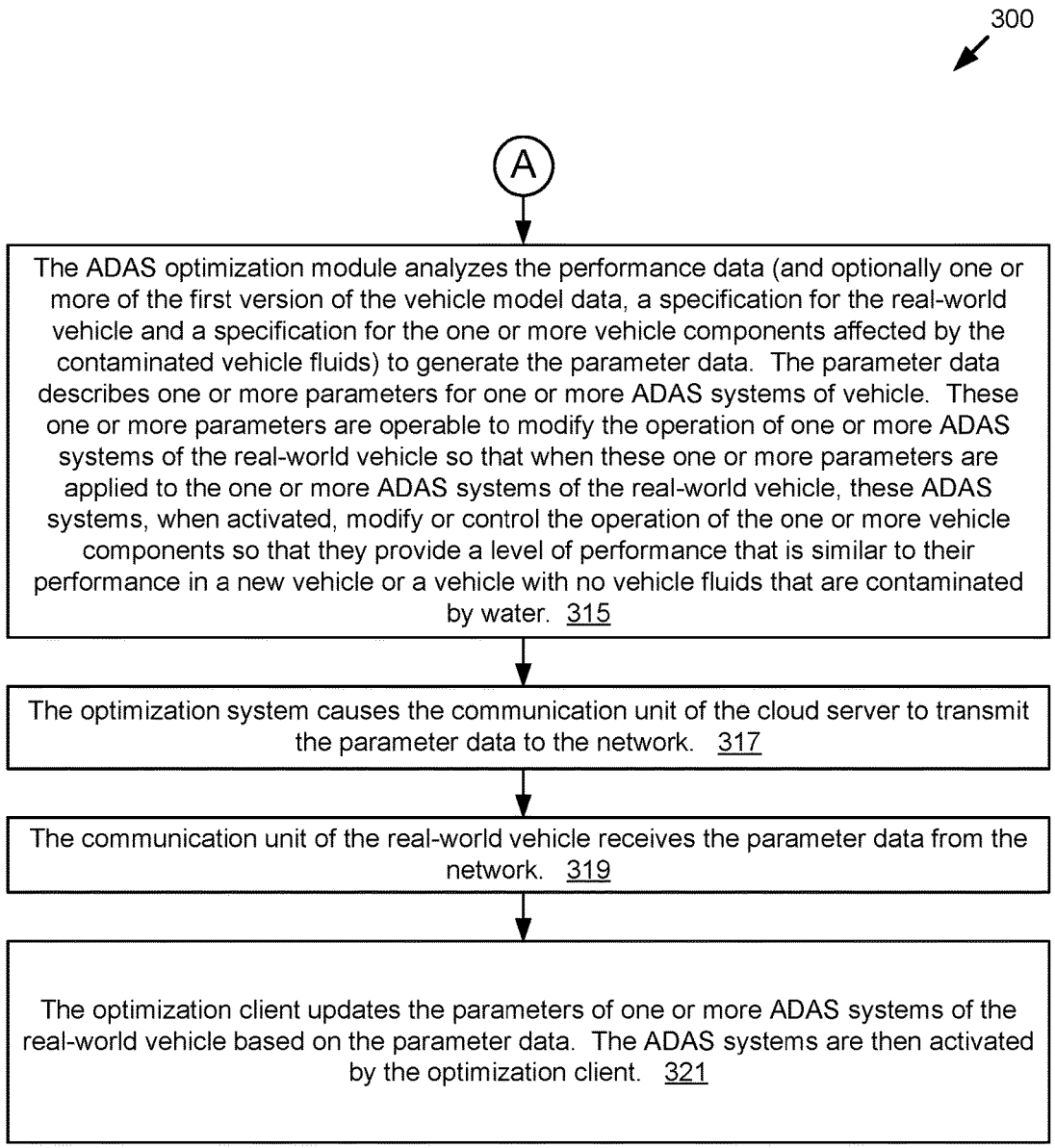

Referring now to FIGS. 3A and 3B, depicted is a flowchart of an example method 300 for modifying one or more parameters of an ADAS system for a vehicle to compensate for the water contamination of one or more vehicle fluids according to some embodiments.

One or more of the steps described herein for the method 300 may be executed by one or more computer systems 200.

Referring now to FIG. 3A. At step 303, the optimization client of a real-world vehicle causes a refractometer to analyze the vehicle fluid present in one or more vehicle components of the real-world vehicle. This yields the sensor data. The different vehicle fluids of the vehicle are measured individually. In some embodiments, the sensor data describes the refractometer measurements recorded by the refractometer for individual vehicle fluids. The refractometer measurements may include, for example, a value describing a refractive index of the vehicle fluid which is measured by the refractometer. Discrete instances of sensor data may include one or more bits of data that identify a particular vehicle fluid which was measured so that different vehicle fluids are capable of individual analysis.

At step 305, the optimization client analyzes the sensor data to determine the contamination data.

At step 307, the optimization client causes the communication unit of the real-world vehicle to wirelessly transmit the contamination data to the network.

At step 308, the communication unit of the server receives the contamination data from the network. The contamination data is stored on a non-transitory memory of the server or transmitted to a modeling application.

At step 309, the modeling application (or a plug-in of the modeling application) analyzes the contamination data to determine how to modify the vehicle model data from the real-world vehicle so that a virtual vehicle, when simulated by a game engine, accurately simulates the performance of the real-world vehicle when operating with the water contamination of the vehicle fluids as described by the contamination data. The modeling application (or the plug-in) updates the vehicle model data accordingly.

At step 311, the game engine generates the simulation data based on the vehicle model data (which has been modified).

In some embodiments, the modeling application includes a simulation application that is operable to generate the simulation data based on the second version of the vehicle model data. The modeling application may then provide the simulation data to the game engine.

At step 313, the game engine generates a simulation based on the simulation data. For example, the game engine executes the simulation data or causes a processor to execute the simulation data within the context of the game engine.

In some embodiments, as the simulation is executed the performance data is generated over time. The performance data is generated by the game engine.

Referring now to FIG. 3B. At step 315, the ADAS optimization module analyzes the performance data (and optionally one or more of the first version of the vehicle model data, a specification for the real-world vehicle and a specification for the one or more vehicle components affected by the contaminated vehicle fluids) to generate the parameter data. The parameter data describes one or more parameters for one or more ADAS systems of vehicle. These one or more parameters are operable to modify the operation of one or more ADAS systems of the real-world vehicle so that when these one or more parameters are applied to the one or more ADAS systems of the real-world vehicle, these ADAS systems, when activated, modify or control the operation of the one or more vehicle components so that they provide a level of performance that is similar to their performance in a new vehicle or a vehicle with no vehicle fluids that are contaminated by water.

At step 317, the optimization system causes the communication unit of the cloud server to transmit the parameter data to the network.

At step 319, the communication unit of the real-world vehicle receives the parameter data from the network.

At step 321, the optimization client updates the parameters of one or more ADAS systems of the real-world vehicle based on the parameter data. The ADAS systems are then activated by the optimization client.

Figure 4:
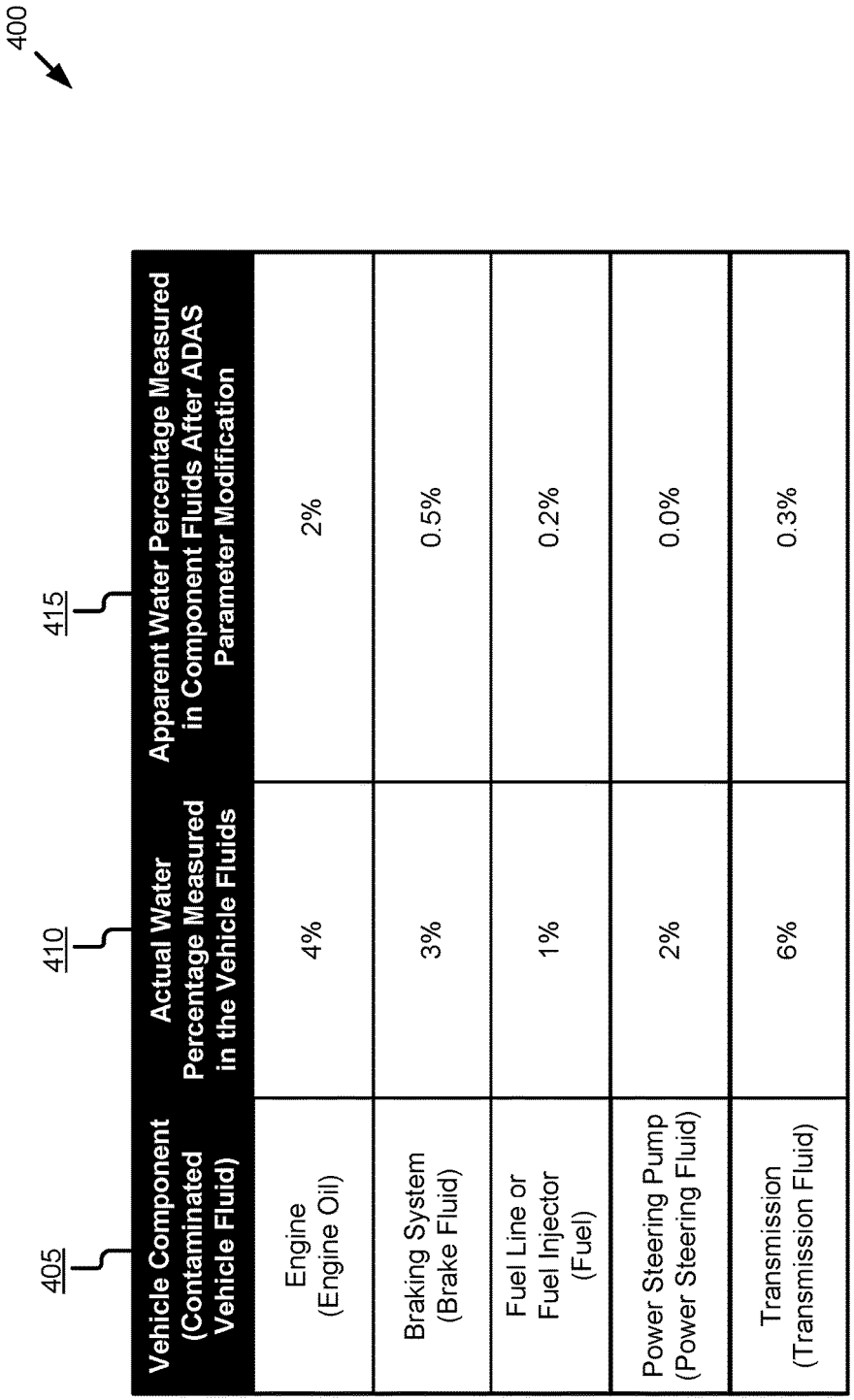
FIG. 4 is a block diagram illustrating table describing how the parameters of one or more ADAS systems of a vehicle are modified to compensate for the water contamination of a plurality of vehicle fluids according to some embodiments.

Referring now to FIG. 4, depicted is a block diagram illustrating table 400 describing how the parameters of one or more ADAS systems of a vehicle are modified by the optimization client based on the parameter data to modify the operation of the one or more ADAS systems to compensate for the water contamination of a plurality of vehicle fluids, according to some embodiments.

Column 405 describes example vehicle components whose performance may be affected by water contaminated vehicle fluids. Column 410 describes the actual percentage of water present for these vehicle fluids. Column 415 describes the apparent contamination of these vehicle fluids based on the performance of the vehicle components after the parameters of one or more ADAS systems are modified based on the parameter data.

Figure 5:
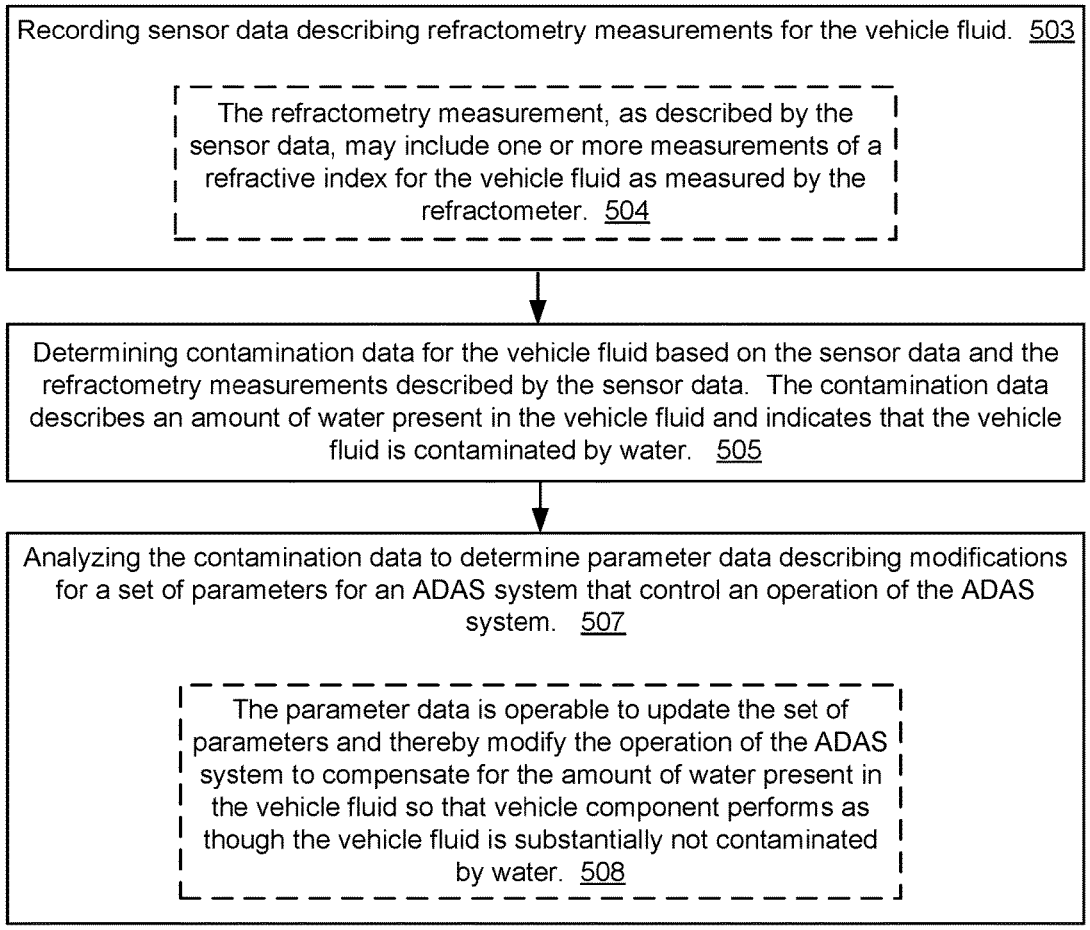
FIG. 5 includes a flowchart of an example method for modifying a performance of a vehicle component whose performance is affected by a vehicle fluid that is contaminated by water according to some embodiments.

Referring now to FIG. 5, depicted is a flowchart of an example method 500 for modifying a performance of a vehicle component whose performance is affected by a vehicle fluid that is contaminated by water according to some embodiments. The vehicle component and the vehicle fluid may be elements of a vehicle. The vehicle itself may be an autonomous vehicle.

At step 503, sensor data describing a refractometry measurement for a vehicle fluid is recorded. The vehicle fluid is one that affects the operation of a vehicle component. The vehicle component is selected from a group that consists of:

an engine; a brake; a brake line; a fuel injector; a fuel line; a power steering unit; and a transmission. The vehicle fluid is selected from a group that consists of: engine oil; brake fluid; fuel; power steering fluid; and transmission fluid.

As described for sub-step 504, the refractometry measurement, as described by the sensor data, may include one or more measurements of a refractive index for the vehicle fluid as measured by a refractometer. The refractometer may be mounted within the vehicle to measure the refractive index for the vehicle fluid. For example, the refractometer may measure how easily light passes through the vehicle fluid to yield the refractometry measurement. This refractometry measurement indicates how much water is present in the vehicle fluid based on how well light passes through the vehicle fluid. For example, light may pass through the vehicle fluid more readily when more water is present in the vehicle fluid, and the refractometry measurement may yield sensor data that describes how well light passes through the vehicle fluid.

In some embodiments, the refractometry measurement may be recorded by a refractometer mounted proximate to the vehicle fluid and operable to record sensor data describing a refractometry measurement for the vehicle fluid.

At step 505, contamination data for the vehicle fluid is determined based on the sensor data and the refractometry measurements described by the sensor data. The contamination data describes an amount of water present in the vehicle fluid and indicates that the vehicle fluid is contaminated by water. For example, the contamination data may include digital data that describes a percentage of water present in the vehicle fluid as indicated by the one or more refractometry measurements described by the sensor data recorded at step 503.

In some embodiments, the contamination data may be determined by an onboard vehicle computer system that is communicatively coupled to the refractometer and the ADAS system. The onboard vehicle computer system includes a non-transitory memory storing computer code that is operable, when executed by the onboard vehicle computer system, to determine the contamination data for the vehicle fluid is determined based on the sensor data and the refractometry measurements described by the sensor data.

At step 507, the contamination data is analyzed to determine parameter data describing modifications for a set of parameters for an ADAS system that control an operation of the ADAS system.

In some embodiments, the ADAS system is a vehicular system (e.g., an element of the vehicle) that is operable to perform or control a performance of one or more of the following vehicle functions: how easily a steering wheel of the vehicle is turned by a driver of the vehicle; how much resistance the steering wheel provides to the driver when the driver turns the steering wheel; how readily a braking system of the vehicle decelerates when the driver depresses a braking pedal of the vehicle; how readily an engine of the vehicle accelerates when the driver of the vehicle depresses an accelerator of the vehicle; how aggressive or passive a transmission of the vehicle changes one or more gears of the transmission when the driver of the vehicle provides an input that is operable to affect how or when the transmission changes the one or more gears of the transmission; and how sluggish an engine of the vehicle performs when the driver provides an input that is operable to affect the operation of the engine.

As indicated by sub-step 508, the parameter data is operable to update the set of parameters and thereby modify the operation of the ADAS system to compensate for the amount of water present in the vehicle fluid so that vehicle component performs as though the vehicle fluid is substantially not contaminated by water. For example, the vehicle component operates as though the percentage of water present in the vehicle fluid is 0% or substantially 0%. In another example, with reference to FIG. 4, the vehicle component described in column 405 operates as though the contamination data indicated by column 415 instead of the contamination data indicated by column 410, thereby improving the performance of the vehicle component whose operation is affected by this particular vehicle fluid.

In some embodiments, the parameter data is determined by a server (e.g., server 107 described above for FIG. 1) that is communicatively coupled to the vehicle (e.g., real-world vehicle 123 described above for FIG. 1) to provide the parameter data to the vehicle via a wireless network (e.g., network 105 described above for FIG. 1).

In some embodiments, the server includes code and routines (e.g., the optimization system 199 described above with reference to FIGS. 1-4) that are operable, when executed by a processor, to analyze a simulation generated by a game engine (e.g., the game engine 166 described above with reference to FIGS. 1 and 2), wherein the simulation includes a virtual vehicle that is configured to replicate the performance of the vehicle component whose performance is affected by the vehicle fluid that is contaminated by water, wherein the code and routines cause the processor to analyze the simulation to generate the parameter data.

In some embodiments, the method 500 further includes modifying the set of parameters for the ADAS system based on the parameter data. The vehicle is then operated with the ADAS system engaged. Since the set of parameters are modified, the vehicle component operates as though the vehicle fluid is not contaminated by water, or substantially not contaminated by water. In this way, the method 500 beneficially improves the operation of the vehicle component, and thereby also improves the operation of the vehicle.

In some embodiments, the onboard vehicle computer system that determines the contamination data also updates the set of parameters for the ADAS system based on the parameter data. For example, the onboard vehicle computer system includes a non-transitory memory storing computer code that is operable, when executed by the onboard vehicle computer system, to update the set of parameters for the ADAS system based on the parameter data. The parameter data is configured to modify the operation of the ADAS system to compensate for the amount of water present in the vehicle fluid so that vehicle component performs as though the vehicle fluid is substantially not contaminated by water. For example, upon modifying the set of parameters for the ADAS system based on the parameter data, the ADAS system operates the vehicle component in a way that is configured by the parameter data to cause the vehicle component to perform as though the vehicle fluid which affects the operation of this vehicle component is substantially not contaminated by water.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustra-

What is claimed is:

1. A method of modifying a performance of a vehicle component whose performance is affected by a vehicle fluid that is contaminated by water, the method comprising:
   recording sensor data describing refractometry measurements for the vehicle fluid;
   determining contamination data for the vehicle fluid based on the sensor data and the refractometry measurements described by the sensor data, wherein the contamination data describes an amount of water present in the vehicle fluid and indicates that the vehicle fluid is contaminated by water; and
   analyzing the contamination data to determine parameter data describing modifications for a set of parameters for an advanced driver assistance system ("ADAS system") that control an operation of the ADAS system, wherein the parameter data is operable to update the set of parameters and thereby modify the operation of the ADAS system to compensate for the amount of water present in the vehicle fluid so that vehicle component performs as though the vehicle fluid is substantially not contaminated by water.

2. The method of claim 1, wherein the vehicle fluid is selected from a group that consists of: engine oil; brake fluid; fuel; power steering fluid; and transmission fluid.

3. The method of claim 1, wherein the vehicle component is selected from a group that consists of: an engine; a brake; a brake line; a fuel injector; a fuel line; a power steering unit; and a transmission.

4. The method of claim 1, wherein the ADAS system is a vehicular system that is operable to perform or control a performance of one or more of the following vehicle functions: how easily a steering wheel of the vehicle is turned by a driver of the vehicle; how much resistance the steering wheel provides to the driver when the driver turns the steering wheel; how readily a braking system of the vehicle decelerates when the driver depresses a braking pedal of the vehicle; how readily an engine of the vehicle accelerates when the driver of the vehicle depresses an accelerator of the vehicle; how aggressive or passive a transmission of the vehicle changes one or more gears of the transmission when the driver of the vehicle provides an input that is operable to affect how or when the transmission changes the one or more gears of the transmission; and how sluggish an engine of the vehicle performs when the driver provides an input that is operable to affect the operation of the engine.

5. The method of claim 1, wherein the vehicle is an autonomous vehicle.

6. The method of claim 1, wherein the parameter data is determined by a server that is communicatively coupled to the vehicle to provide the parameter data to the vehicle via a wireless network.

7. The method of claim 6, wherein the server includes code and routines that are operable, when executed by a processor, to analyze a simulation generated by a game engine, wherein the simulation includes a virtual vehicle that is configured to replicate the performance of the vehicle component whose performance is affected by the vehicle fluid that is contaminated by water, wherein the code and routines cause the processor to analyze the simulation to generate the parameter data.

8. The method of claim 1, further comprising modifying the set of parameters based on the parameter data and operating the vehicle with the ADAS system engaged subsequent to modifying the set of parameters for the ADAS system based on the parameter data.

9. A system of a vehicle for modifying a performance of a vehicle component whose performance is affected by a vehicle fluid that is contaminated by water, the system comprising:
   a refractometer mounted proximate to the vehicle fluid and operable to record sensor data describing a refractometry measurement for the vehicle fluid;
   an advanced driver assistance system ("ADAS system") including a set of parameters that control an operation of the ADAS system;
   an onboard vehicle computer system that is communicatively coupled to the refractometer and the ADAS system, the onboard vehicle computer system including a non-transitory memory storing computer code which, when executed by the onboard vehicle computer system, causes the onboard vehicle computer system to:
      determine contamination data for the vehicle fluid based on the sensor data and the refractometry measurements described by the sensor data, wherein the contamination data describes an amount of water present in the vehicle fluid and indicates that the vehicle fluid is contaminated by water; and
      update the set of parameters for the ADAS system based on parameter data that is configured to modify the operation of the ADAS system to compensate for the amount of water present in the vehicle fluid so that vehicle component performs as though the vehicle fluid is substantially not contaminated by water.

10. The system of claim 9, wherein the vehicle fluid is selected from a group that consists of: engine oil; brake fluid; fuel; power steering fluid; and transmission fluid.

11. The system of claim 9, wherein the vehicle component is selected from a group that consists of: an engine; a brake; a brake line; a fuel injector; a fuel line; a power steering unit; and a transmission.

12. The system of claim 9, wherein the ADAS system is a vehicular system that is operable to perform or control a performance of one or more of the following vehicle functions: how easily a steering wheel of the vehicle is turned by a driver of the vehicle; how much resistance the steering wheel provides to the driver when the driver turns the steering wheel; how readily a braking system of the vehicle decelerates when the driver depresses a braking pedal of the vehicle; how readily an engine of the vehicle accelerates when the driver of the vehicle depresses an accelerator of the vehicle; how aggressive or passive a transmission of the vehicle changes one or more gears of the transmission when the driver of the vehicle provides an input that is operable to affect how or when the transmission changes the one or more gears of the transmission; and how sluggish an engine of the vehicle performs when the driver provides an input that is operable to affect the operation of the engine.

13. The system of claim 9, wherein the vehicle is an autonomous vehicle.

14. The system of claim 9, wherein the parameter data is determined by a server that is communicatively coupled to the vehicle to provide the parameter data to the vehicle via a wireless network.

15. The system of claim 14, wherein the server includes code and routines that are operable, when executed by a processor, to analyze a simulation generated by a game engine, wherein the simulation includes a virtual vehicle that is configured to replicate the performance of the vehicle component whose performance is affected by the vehicle fluid that is contaminated by water, wherein the code and routines cause the processor to analyze the simulation to generate the parameter data.

16. The system of claim 9, wherein the non-transitory memory stores further computer code which, when executed by the onboard vehicle computer system, causes the onboard vehicle computer system to modify the set of parameters based on the parameter data and operate the vehicle with the ADAS system engaged subsequent to modifying the set of parameters for the ADAS system based on the parameter data.

17. A computer program product comprising a non-transitory memory of an onboard vehicle computer system of a vehicle storing computer-executable code that, when executed by the onboard vehicle computer system, causes the onboard vehicle computer system to:
    record sensor data describing refractometry measurements for a vehicle fluid;
    determine contamination data for the vehicle fluid based on the sensor data and the refractometry measurements described by the sensor data, wherein the contamination data describes an amount of water present in the vehicle fluid and indicates that the vehicle fluid is contaminated by water; and
    analyze the contamination data to determine parameter data describing modifications for a set of parameters for an advanced driver assistance system ("ADAS system") that control an operation of the ADAS system, wherein the parameter data is operable to update the set of parameters and thereby modify the operation of the ADAS system to compensate for the amount of water present in the vehicle fluid so that vehicle component performs as though the vehicle fluid is substantially not contaminated by water.

18. The computer program product of claim 17, wherein the vehicle fluid is selected from a group that consists of: engine oil; brake fluid; fuel; power steering fluid; and transmission fluid.

19. The computer program product of claim 17, wherein the vehicle component is selected from a group that consists of: an engine; a brake; a brake line; a fuel injector; a fuel line; a power steering unit; and a transmission.

20. The computer program product of claim 17, wherein the ADAS system is a vehicular system that is operable to perform or control a performance of one or more of the following vehicle functions: how easily a steering wheel of the vehicle is turned by a driver of the vehicle; how much resistance the steering wheel provides to the driver when the driver turns the steering wheel; how readily a braking system of the vehicle decelerates when the driver depresses a braking pedal of the vehicle; how readily an engine of the vehicle accelerates when the driver of the vehicle depresses an accelerator of the vehicle; how aggressive or passive a transmission of the vehicle changes one or more gears of the transmission when the driver of the vehicle provides an input that is operable to affect how or when the transmission changes the one or more gears of the transmission; and how sluggish an engine of the vehicle performs when the driver provides an input that is operable to affect the operation of the engine.

* * * * *